(12) United States Patent
Okada

(10) Patent No.: US 9,545,679 B2
(45) Date of Patent: Jan. 17, 2017

(54) SAW BLADE

(71) Applicant: Kabushiki Kaisha Okada Kinzoku Kogyosho, Miki-shi (JP)

(72) Inventor: Tamotsu Okada, Miki (JP)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 29 days.

(21) Appl. No.: 14/495,065

(22) Filed: Sep. 24, 2014

(65) Prior Publication Data
US 2015/0089818 A1 Apr. 2, 2015

(30) Foreign Application Priority Data

Sep. 27, 2013 (JP) ................................ 2013-200945
Jan. 22, 2014 (JP) ................................ 2014-009136

(51) Int. Cl.
*B23D 45/16* (2006.01)
*B23D 61/00* (2006.01)
*B23D 61/12* (2006.01)

(52) U.S. Cl.
CPC ............. *B23D 45/16* (2013.01); *B23D 61/006* (2013.01); *B23D 61/121* (2013.01)

(58) Field of Classification Search
CPC ...... B23D 45/16; B23D 61/006; B23D 61/121
See application file for complete search history.

(56) References Cited

U.S. PATENT DOCUMENTS

| 2,239,317 | A | 4/1941 | Gibb |
| 5,265,340 | A | 11/1993 | Nitz et al. |
| 2002/0104421 | A1* | 8/2002 | Wurst ............... B23D 61/006 83/835 |
| 2003/0014067 | A1* | 1/2003 | Kullmer ............. A61B 17/14 606/176 |
| 2010/0288099 | A1* | 11/2010 | Steiger ............... B23D 61/00 83/846 |
| 2011/0219929 | A1* | 9/2011 | Mann ............... B23D 61/006 83/607 |
| 2013/0133501 | A1* | 5/2013 | Zhang ............... B23D 61/006 83/697 |
| 2015/0089818 | A1* | 4/2015 | Okada ............... B23D 61/006 30/347 |

FOREIGN PATENT DOCUMENTS

| DE | 3525445 A1 | 11/1986 |
| DE | 102009030854 A1 | 1/2011 |
| EP | 2 853 330 A1 * | 4/2015 |
| JP | 2000-512561 A | 9/2000 |
| WO | WO-97/49517 A2 | 12/1997 |

* cited by examiner

*Primary Examiner* — Hwei C Payer
(74) *Attorney, Agent, or Firm* — Locke Lord LLP; James E. Armstrong, IV; Howard M. Gitten

(57) ABSTRACT

A saw blade for an electric saw tool with a drive shaft making a reciprocating arcuate swing motion, the saw blade comprising a saw plate which has centrally a coupling part for connecting and fixing the saw plate to the drive shaft of the saw tool and has an appearance as being elliptic, and has cutting teeth on the outer periphery. Also, a saw blade for an electric saw tool with a drive shaft making a reciprocating arcuate swing motion, the saw blade having at one end a coupling part for connecting and fixing the saw blade to the drive shaft of the saw tool and having at the other end cutting teeth of the saw blade, and height of the cutting teeth being smaller in the order from near to at both ends of a line of the teeth.

1 Claim, 4 Drawing Sheets

Prior Art

SAW BLADE

BACKGROUND OF THE INVENTION

Field of the Invention

The present invention relates to a novel structure for a saw blade in such type that the saw blade is mounted and fixed to a drive source, which source performs a reciprocating circular motion (movement) with a small extent of swing amplitude (rotation angle), in order to make cutting.

The terminology "the arcuate swing" referred to hereunder in the specification signifies the aforementioned "reciprocating circular motion with a small extent of swing amplitude (rotation angle)".

Prior Art

A saw blade is generally categorized in either a type of operation with a reciprocation movement (typically of a manually operable saw) or a type of circular movement (as a round saw). Both types of saw have high ability of cutting but do not yet become an ideal tool since they are problematic in safety, scatter loose particles from cutting, make loud noises, and so on.

Meanwhile, a specific electric cutting tool has been proposed as follows.

In detail, as shown in FIG. 6, a saw blade B exclusively used in the electric cutting tool is mounted and fixed, by use of a tightening screw, to a drive shaft A set in the body of the electric cutting tool. (The tool exemplified in FIG. 6 may mount, for example, a polishing member in place of the saw blade to thereby also serve as an electric file (rasp) or polisher.)

The drive shaft A does not make a unidirectional rotation but has a swing style of performing a reciprocating arcuate movement (arcuate swing) of a quite small swing angle (generally about 3.0 degrees). The tool is activated to cause the whole of the exclusive saw blade B to reciprocate at a small central angle. Strictly speaking, the cutting teeth on the saw blade make a circular movement, but show a spurious situation of linear reciprocating movement due to the quite small swing angle. And practically, due to the quite small swing amplitude, users who holding the tool in swinging may feel swing as of a swing type electric razor but is not impressed with as that the blade reciprocates transversely.

The cutting operation using the tool is carried out merely by straightly pushing the saw blade against wood to form a "slit hole" in the wood. For example, a saw blade disclosed in Japanese Unexamined Patent Application Publication No. 2000-512561 official gazette has basically the same structure as the exclusive saw blade B.

Naturally, it is possible to make a slit hole in the wood by use of a conventional hand-held saw with a round blade. However, this cutting is performed through unidirectional rotation of the blade. Thus, the blade basically tends to roll along on the wood to be worked. In detail, the cutting operation is carried out by first making a narrow through bore against the blade's force of rolling along on the wood, and then making larger the width of the through bore to a predetermined size. For this, it is naturally necessary to learn a specific working technique, which unlike the operation using the tool shown in FIG. 6 for which operation it is enough to merely push the tool's blade straightly against the wood in the direction of the wood's thickness. Besides, in use of the round saw, the loose particles from cutting jet and scatter at a substantial high initial rate from the slit bore being worked, thereby having a problem of deteriorating the working circumstances. This can be said to have various problems, such as high dangerousness and so on.

The mentioned problems can be cleared by use of the method making use of "the arcuate swinging of blade" for performing cutting. When the exclusive saw blade B is used for cutting, cutting can be carried out without troubles at the beginning of operation or when cutting a thin wood. However, there will be inconvenience when making a slit hole in a thick wood. In detail, there is such danger that the saw blade's left side end and right side end continue to collide against left and right lateral sides of the slit hole in the wood to thereby be heated and finally smoke, or, the cutting teeth on the ends of the saw blade are deformed due to heating. Such troubles have been confirmed actually.

Regarding reasons of happening of the above-mentioned facts which reasons will be detailed later, it is so inferred that as the cutting operation proceeds, the saw blade collides against the left and right sidewalls of the slit hole. Practically, there has been neither brought onto the market nor proposed any attempts of an improved saw blade structure having no above-mentioned troubles or proposing any improvement for them although generation of heat and deformation was known and seen as a problem.

SUMMARY OF THE INVENTION

Thus, the inventor has achieved the present invention after having zealously made the study regarding the above-mentioned points. The invention relates to a saw blade for an electric saw tool with a drive shaft making a reciprocating arcuate swing motion and is characterized in that the saw blade comprises a saw plate which has centrally a coupling part for connecting and fixing the saw blade to the drive shaft of the saw tool and has an appearance as being elliptic, and has cutting teeth on the outer periphery. The present invention also relates to a saw blade for an electric saw tool with a drive shaft making a reciprocating arcuate swing motion and is characterized in that the saw blade has at one end a coupling part for connecting and fixing the saw plate to the drive shaft of the saw tool and has at the other end cutting teeth of the saw blade, and height of the cutting teeth being smaller in the order from near to at both ends of a line of the teeth.

DETAILED DESCRIPTION OF THE INVENTION

The saw blade according to the present invention is to be mounted to an electric saw tool with a drive shaft making a reciprocating arcuate swing motion and is an exclusively used article as mentioned previously. The electric saw tool makes a reciprocating arcuate motion (arcuate swing) of a quite small swing angle (3.0 or less degrees generally). The coupling part of the saw blade is fixed to the placement position of the rotation shaft.

The saw blade according to the present invention includes two kinds of structures.

A first structure is that a saw blade has at the center a coupling part for the saw blade, has appearance of being elliptic, and is provided with cutting teeth on the outer periphery.

The structure with the cutting teeth provided along an elliptic line means that the cutting teeth are radially arranged. And the saw plate is provided all over at its entire peripheral edge with the cutting teeth, so that whatever radial direction the saw plate is pushed into wood, any of the cutting teeth are necessarily brought into contact with the wood. Thus, there does not at all fall into such circumstance that the saw plate contacts, at its lateral side part having no cutting teeth as the exclusive saw blade B shown in FIG. 6, with the wood to thereby generate heat and deform.

Hence, the saw blade needs low strength for collision resistance, whereby obtaining also such a secondary effect as that a thinner saw blade can be employed.

With the elliptic saw blade being connected at its center to the electric saw's drive source to perform reciprocating arcuate swing, the saw blade according to the present invention provides different shapes of cutting to be formed in the wood when the major diameter of the elliptic saw blade is opposite to the wood, or the minor diameter of the saw blade is opposite to the wood. In other words, two kinds of cutting shapes are obtainable with a single blade.

Although having the cutting teeth along the entire periphery of the ellipse of the saw blade in this example according to the present invention, only a part of the cutting teeth actually engages in the cutting operation. In this instance, cutting teeth at the opposite side of the elliptic saw blade are not used. Thus, when the saw blade has been used for many hours to show a poor cutting efficiency or is broken of any ones of the cutting teeth, or in a like situation, the saw blade may be reset by turning 180 degrees to be freshly used. This means that the present invention in this example includes a spare blade.

A second structure of the present invention provides the cutting teeth on the saw blade at its opposite end to the coupling part.

Hence, when the swing angle is 2 degrees, a line of teeth forming the cutting teeth does perform a reciprocating arcuate motion 1 degree clockwise with respect to a standard state and 1 degree counterclockwise. In this instance, if the line of teeth is straight, the saw blade when rotates clockwise does lean at its left side to and collides against the object to be cut (the wood) and does so at the right side of the blade when rotates counterclockwise.

The invention does provide that height of the cutting teeth is set to be smaller at a position of the line of teeth near its left and right ends, so that the extent of the above-mentioned colliding is made smaller in order to eliminate generation of heat and deformation of the saw blade.

Height of the cutting teeth is smallest at both ends of the line of cutting teeth and becomes larger toward the central part of the line of cutting teeth. The extent of variation of height of the cutting teeth may be designed appropriately depending upon a distance between the coupling part and the cutting teeth (rotation radius), length of the line of cutting teeth, and the swing angle.

To be noted is that the present invention relates to the structure of saw blade and does not limit details of the structure of the tool body to drive the saw blade. However, configuration of the drive that the tool body transmits to the saw blade according to the present invention is limited to the "arcuate swing". Therefore, it is improper that the invention is applied to an electric tool having such configuration of drive as a straight reciprocating movement like a manually operated saw, or a unidirectional rotation movement like a round saw.

The saw blade according to the present invention is to be mounted to the tool body and has at the center a coupling part for coupling and fixing the saw blade to the drive shaft of the tool body. As above mentioned, the tool body of this kind may be generally used selectively using replaceable other members for any other purposes. Thus, it is preferable that the coupling part of the blade is readily attached to and detached from the tool body.

The saw blade according to the present invention is a saw blade for an electric saw tool with a drive shaft making a reciprocating arcuate swing movement, the saw blade comprising a saw plate which has centrally a coupling part for connecting and fixing the saw plate to the drive shaft of the saw tool, and, characterized in that the saw plate has an appearance as being elliptic, and has cutting teeth on the outer periphery. The present invention also relates to a saw blade for an electric saw tool with a drive shaft making a reciprocating arcuate swing movement, the saw blade having at one end a coupling part for connecting and fixing the saw blade to the drive shaft of the saw tool and having at the other end cutting teeth of the saw blade, and, characterized in that height of the cutting teeth being smaller in the order from near to at both ends of a line of the teeth. Hence, the saw blade according to the present invention is at a quite high level and has such advantages that the saw blade, when mounted to the tool having the drive shaft making the arcuate swing with a small rotation angle, can cut also thick wood for which cutting operation was not likely hitherto due to heat generation or deformation of the saw blade, and a thin blade structure is readily available thanks to having almost no heat generation and deformation of saw blade.

PREFERRED EMBODIMENTS OF THE INVENTION

Example 1

Figure 1:
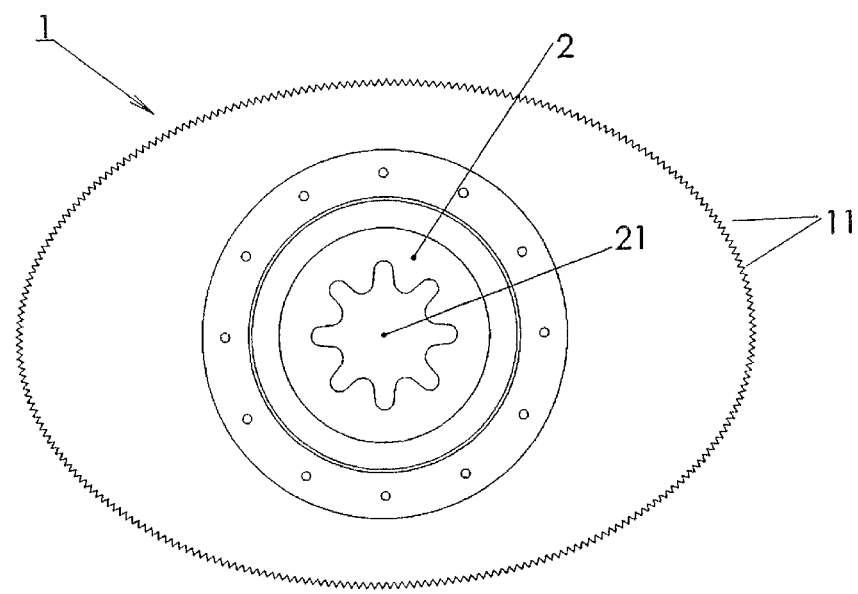
FIG. 1 is a schematic plan view showing an example of a saw blade according to the present invention.
Figure 2:
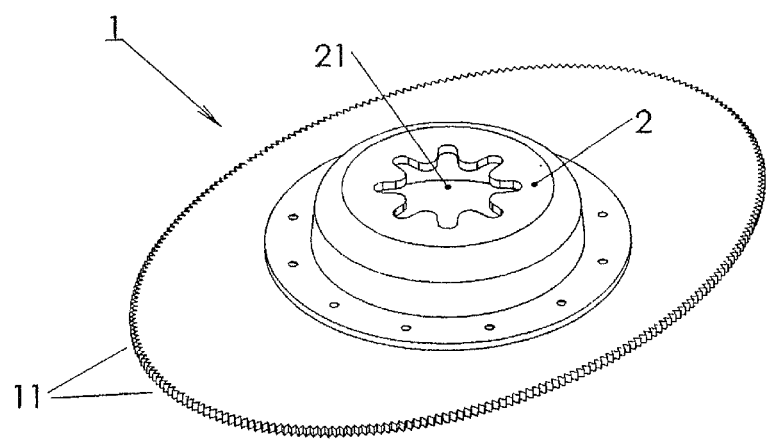
FIG. 2 is a schematic perspective view showing an example of a saw blade according to the present invention.

FIGS. 1 and 2 show an example of a saw blade 1 according to the present invention (called hereunder the saw blade 1), FIG. 1 being a plan view and FIG. 2 a perspective view. As seen from the drawings, the saw blade 1 in this example is generally elliptic in shape.

Figure 6:
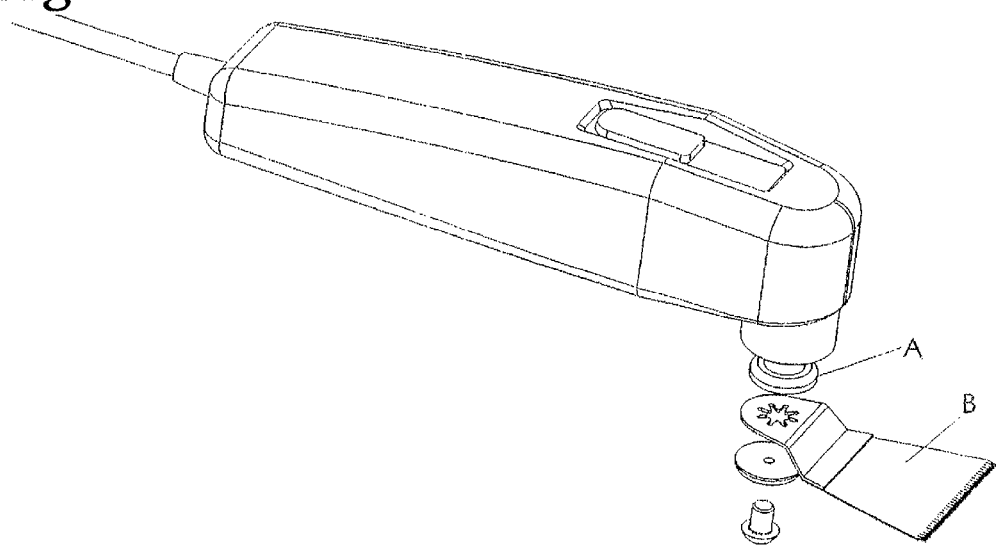
FIG. 6 is a plan view showing an electric saw tool to which the saw blade according to the present invention is mounted, and an exemplified conventional art of saw blade conventionally mounted to the electric saw tool.

The saw blade 1 is a saw blade to be mounted to a tool having a drive shaft of a quality to make an arcuate swing (for example, the tool shown in FIG. 6). The central angle of the arcuate swing in this example is 1.6 degree.

Cutting teeth 11 are formed on the whole of the elliptic periphery of the saw blade. Teeth 11 are each symmetrically formed at the left and right sides with respect to a line connecting the center of the arcuate swing with crests of the teeth. Thus, there is not caused any difference of the cutting capability in the reciprocation upon the arcuate swing. The number of the cutting teeth 11 is about 250 in this example which is more than twice in comparison with the number of cutting teeth on round saw blade of the conventional handheld type saw.

In the present invention, the cutting teeth perform the arcuate swing as mentioned previously. Distances (of separation, more precisely, angles of separation) between the cutting teeth neighboring with each other, are restricted by the arcuate swing angle. In other words, a cutting tooth reciprocates in a given angle and another cutting tooth neighboring that cutting tooth does similarly reciprocate in the same angle. If the cutting teeth are separated from each other by more than that angle of reciprocation, there is created a part which is not subjected to cutting.

Namely, it is preferable that the total number of the cutting teeth is more than 225 (=360÷1.6, when the arcuate swing is performed with an angle of 1.6 degrees), and more than 180 (=360÷2, when the arcuate swing with 2 degrees).

The angle for the arcuate swing in the range of 1 through 3 degrees may be best, while it is likely to injure workers and has a problem of safety when the arcuate swing angle is over that range, and the capability of cutting is deteriorated when the arcuate swing angle is below that range and threat too many total number of cutting teeth work together.

A coupling part 2 to connect the saw blade 1 with the tool body is positioned at the center of the saw blade 1 according to the present invention. The coupling part 2 in this example is so structured that the coupling part 2 can be attached and fixed to the tool body with the attaching angle being changeable by pitch of 45 degrees. Besides, in this example, the saw blade 1 is attached to the tool in such manner that the saw blade 1 is, for having no projected part on the rear surface (the surface facing the wood upon cutting operation), provided with a swollen part at the side of mounting the saw blade to the tool, a drive shaft for motor in the saw tool is inserted into a mounting opening 21 formed on the swollen part's upper surface and the motor's drive shaft projecting downwards from the opening 21 is fixedly screwed by use of a coupling screw member (not shown). In other words, the coupling screw member is screwed at the rear side of the saw blade. In the shown example, the coupling screw member is placed in the inner space of the swollen part. By this, workability is improved and use is widened.

Figure 3:
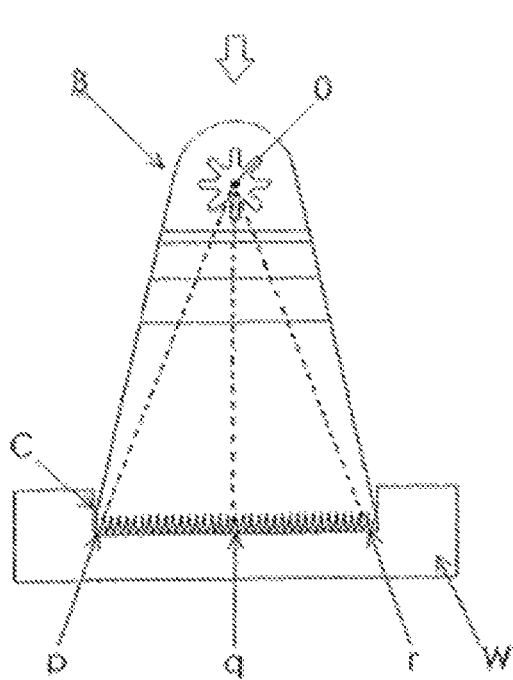
FIG. 3 is an explanatory plan view showing comparison between a conventional saw blade (FIG. 3(*a*)) and an example of a saw blade according to the present invention (FIG. 3(*b*)).
Figure 3:
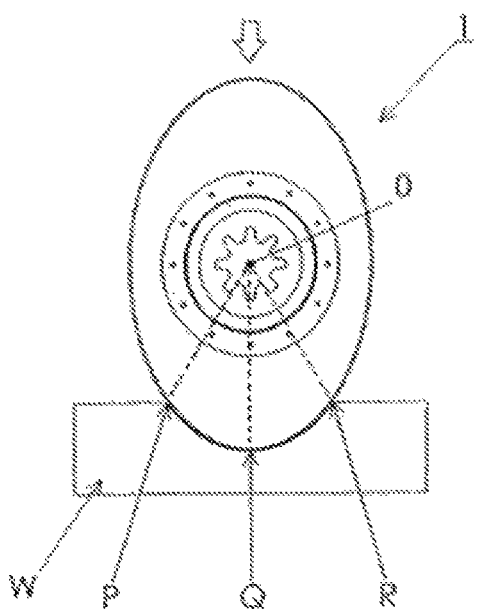

FIGS. 3(a) and 3(b) are schematic plan views showing and comparing a conventional type of saw blade B with a saw blade 1 according to the present invention, both used in this kind of sawing tool.

FIGS. 3(a) and 3(b) also show the state of cutting operation that the tool body is pushed in the direction of the arrow into the comparatively thick wood W to be worked and cutting progresses to some extent.

For comparison, features of the cutting teeth p, q, r in FIG. 3(a) and P, Q, R in FIG. 3(b) are noted.

The cutting teeth p, r, P, R are positioned at the outer end parts of the saw blades B and 1 and there contribute to cutting. And the cutting teeth q, Q are positioned almost centrally between the outer end parts.

When the saw blade performs the arcuate swing, all of the cutting teeth naturally also perform the arcuate swing. In the conventional saw blade B shown in FIG. 3(a), a cutting tooth extending in the radial direction from the center O of the arcuate swing is only the cutting tooth q. Other teeth than the cutting tooth q positioned outwardly thereof gradually deviate from the radiuses from the center O, and cutting teeth p, r substantially deviate from the radiuses which direction no longer called radiuses. Furthermore, there exist no cutting teeth outwardly of the cutting teeth p, r, whereby the saw blade B when swings merely collide against the wall C.

Moreover, in FIG. 3(a), amid the cutting operation, the tool substantially cannot be changed of the direction of being pushed into the wood from the initial direction shown by the arrow to any directions. Unless the tool is continued to be pushed precisely in the direction shown by the arrow, the frequency and force of collision increase to thereby make higher the previously mentioned danger of smoking from heating and deformation of saw blade.

Contrary to the above, the saw blade 1 according to the present invention, namely, the feature shown in FIG. 3(b), cuts the wood and forms a hole in shape of an arc of an ellipse. All the cutting teeth on the saw blade are arranged in the radial direction from the center O. In detail, the cutting teeth P, Q, R are arranged in a manner and situation of being capable of performing cutting. When the tool body is pushed into the wood in the direction shown by the arrow, mainly the cutting tooth Q and several cutting teeth at both sides of the cutting tooth Q contribute to the cutting. And when the tool body is pushed in the direction of the cutting tooth P, the wood is cut in this direction.

Example 2

Figure 4:
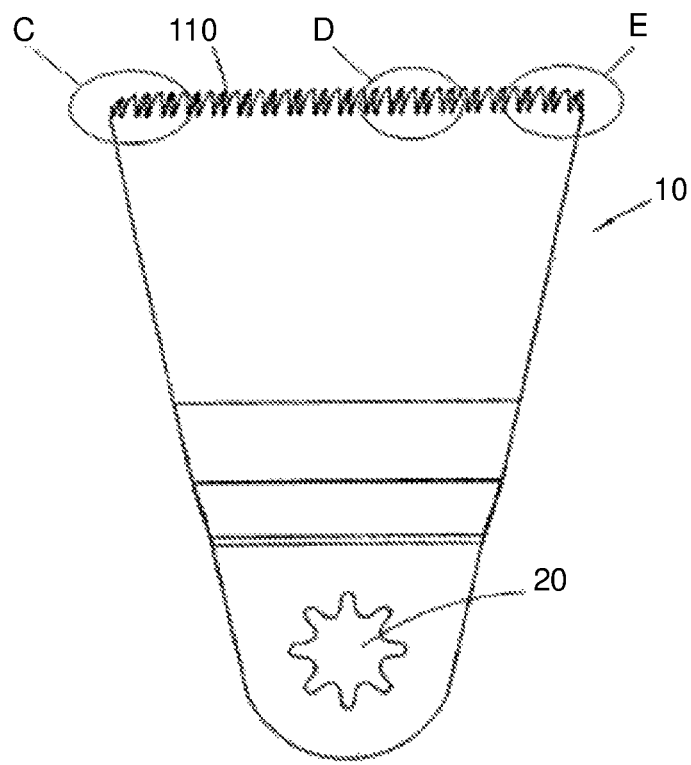
FIG. 4 is an explanatory view showing another example of a saw blade according to the present invention, FIG. 4(*a*) being a schematic plan view and FIG. 4(*b*) a schematic side view.
Figure 4:
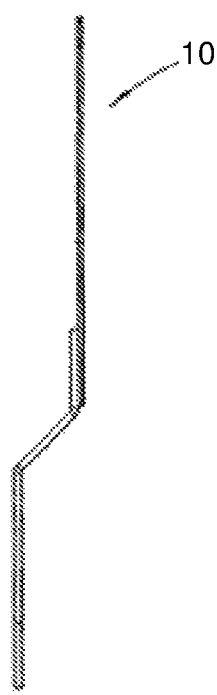

FIG. 4 is an explanatory view showing another example of a saw blade 10 according to the present invention (called hereunder the saw blade 1), FIG. 4(a) being a schematic plan view and FIG. 4(b) a schematic side view. A saw blade 10 is a saw blade to be mounted to a tool having a drive shaft of a quality to make an arcuate swing (for example, the tool shown in FIG. 6). The saw blade 10 is connected and fixed, at its coupling part 20 to the drive shaft of the tool. Besides, the saw blade 10 is provided with cutting teeth 110 at a remote end opposite to the coupling part 20.

In this example, the central angle of the arcuate swing is 1.6 degrees.

Figure 5:
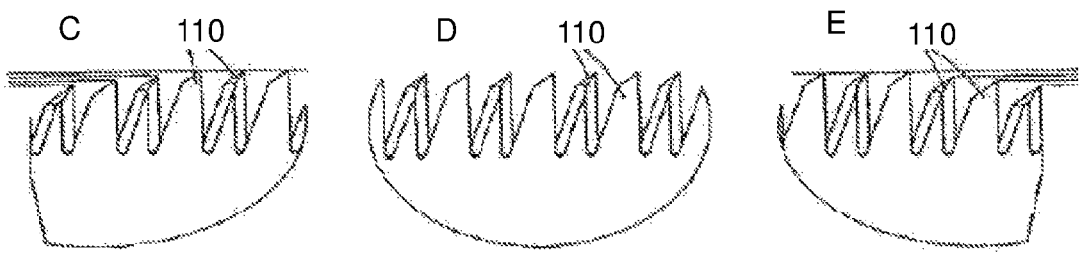
FIG. 5 is an enlarged view of the parts A, B, and C shown in FIG. 4(*a*).

The cutting teeth 110 are arranged in a line but are not uniform in height with teeth near and at both ends of the saw blade being smaller in height. FIG. 5 is an enlarged view of the parts C, D, E shown in FIG. 4(a), showing the cutting teeth 110 around the central region (part D) of the saw blade 10, around the right end (part E), and around the left end (part C).

As seen in the drawings, the cutting teeth near and at both ends of the saw blade 10 are made slightly smaller in height. Thus, appearance of these teeth is not largely different from the conventional saw blade (for example, that shown in FIG. 6). However, the slight difference of height among the cutting teeth at the saw blade's both ends provides a quite large effect in and upon cutting.

The inventor made a trial manufacture and experiment and found that the saw blade 10 according to the present invention can cut, with having energy left, a thick wood which it is hard or impossible for a conventional saw blade to cut and form a through bore.

What we claimed is:

1. A saw blade for an electric saw tool with a drive shaft making a reciprocating arcuate swing motion, the saw blade having at one end a coupling part for connecting and fixing the saw blade to the drive shaft of the saw tool and having at the other end cutting teeth of the saw blade, the cutting teeth each having a tooth base and an opposing tooth tip, the bases being arranged in a straight line, the cutting teeth having in sequence a first end, a central region and a second end and characterized in that the tips of the cutting teeth of the first end and the tips of the cutting teeth of second end extend to a height smaller than the height to which the tips of the cutting teeth of the central region extend.

* * * * *